Sept. 23, 1969  W. A. RHEINFELDER  3,469,190
TUNABLE R.F. VOLTMETER FOR CATV SIGNAL LEVEL INDICATION
Filed June 27, 1966  2 Sheets-Sheet 1
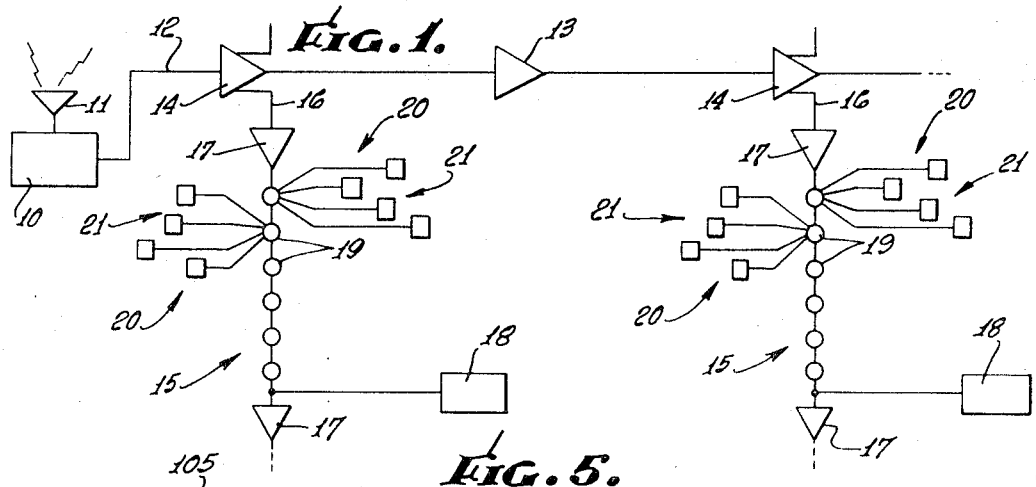
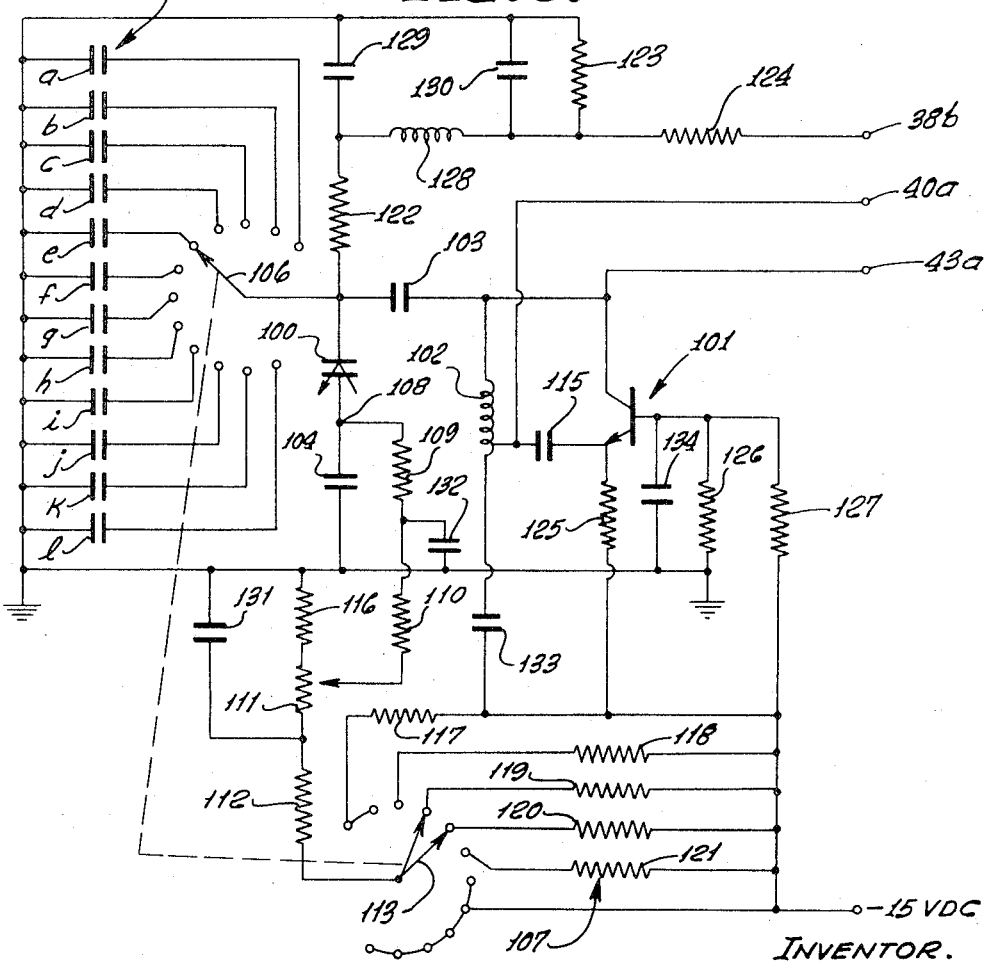
INVENTOR.
WILLIAM A. RHEINFELDER
By White & Haefliger
ATTORNEYS.

Sept. 23, 1969  W. A. RHEINFELDER  3,469,190
TUNABLE R.F. VOLTMETER FOR CATV SIGNAL LEVEL INDICATION
Filed June 27, 1966  2 Sheets-Sheet 2

INVENTOR.
WILLIAM A. RHEINFELDER
By White & Haefliger
ATTORNEYS.

United States Patent Office 3,469,190
Patented Sept. 23, 1969

3,469,190
TUNABLE R.F. VOLTMETER FOR CATV SIGNAL LEVEL INDICATION
William A. Rheinfelder, South Laguna, Calif., assignor, by mesne assignments, to Anaconda Electronics Company, Anaheim, Calif., a corporation of Delaware
Filed June 27, 1966, Ser. No. 560,659
Int. Cl. H04b 3/02, 1/00
U.S. Cl. 325—67
6 Claims

ABSTRACT OF THE DISCLOSURE

The disclosure concerns signal level indication equipment for use in a cable television system, and including a probe containing phase sensitive and synchronous detector elements and having a terminal to be brought into contact with an R.F. signal level test point of the system in such manner that the detector inputs are located proximate the test point.

---

This invention relates generally to cable television systems, and more specifically concerns the determination of radio frequency signal levels in such systems.

It is necessary in cable television systems to measure small radio frequency voltages with high precision, an accuracy of ±0.1 db being desirable. R.F. measurements are typically made in the field in order to determine relative signal levels of various television channels at different amplifiers operating to increase such levels. However, the accuracy of such measurements has in the past been no greater than ±1.0 db due to inaccuracies introduced by the test equipment such as field strength meters, the characteristics of jumper cables leading from amplifier signal level test points to the test equipment, test point mismatch and error introduced by channel tuner design. For example, the use of jumper cable tends to cause the signal levels at certain channels to read too high and the signal levels at other channels to read too low. Even when used with good matches, jumper cables cause appreciable reading error; thus, despite realization of voltage standing wave ratio (VSWR) of 1.1, considered a good match when using jumper cable, the latter is still capable of producing errors of ±1.0 db.

It is a major object of the present invention to eliminate or substantially reduce the above mentioned problems through the provision of R.F. signal level measurement instrumentation of high accuracy and which obviates need for appreciable jumper cable leading from test points to input signal utilization circuitry of the instrument. Basically, the signal level indicating equipment of the invention includes a phase sensitive detector and a synchronous detector, both of the high impedance variety, the phase detector being used to phase-lock an oscillator, and the latter used to drive the synchronous detector to produce a DC output substantially proportional to the level of the cable system R.F. signal at the test point, whereby very high selectivity is obtained. Also, both detectors are linearized by the relatively large oscillator voltage, and the synchronous detector does not respond to modulation or noise due to the effective bandwidth of the phase-locked loop. As will be seen, the equipment typically includes an easily manipulable probe having a body and a terminal adapted to be brought into contact with a test point, and the phase sensitive and synchronous detectors are carried by the body to place the terminal in close proximity to the system R.F. signal inputs to the detectors. In this way, the oscillator and the DC output indicating means may be spaced from the probe with elongated flexible cable connection to the detectors carried by the probe, all without sacrifice of output reading accuracy.

Additional objects and advantages of the invention include the provision of a fastener to connect the probe to a support at a circuit test point to be contacted by the probe terminal; and the provision of phase detector and synchronous detector bridge networks adapted to be carried by the probe body, and the synchronous detector driven by oscillator output in phase quadrature with respect to the oscillator output to the phase detector, as will be seen. Further, the principles of the invention can be extended to applications where extremely precise selective R.F. voltmeters are needed.

These and other objects and advantages of the invention, as well as the details of an illustrative embodiment, will be more fully understood from the following detailed description of the drawings, in which:

FIG. 1 is a generalized block diagram showing a portion of a cable television system;

FIG. 5 is a diagram illustrating a voltage controlled tunable oscillator circuit usable in the FIG. 1 block diagram.

Figure 2:
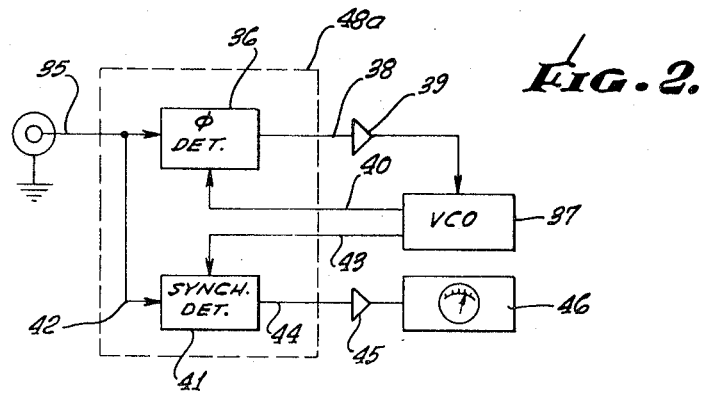
FIGURE 2 is a block diagram showing the signal level indicating equipment of the invention.

Referring first to FIG. 1, the illustrated cable television system includes head end equipment 10 with antenna 11 to pick up broadcast multi-channel television signals. Such equipment is known and is operable to correct and adjust the signal level for each channel, with separate correction for picture and sound carriers. Such equipment also typically includes preamplifiers, demodulators, modulators for each channel, together with a multi-channel combining network, the output of which is applied to the cable system.

To the right of the equipment 10 is shown a main trunk line which is the major link from the head end 10 to the community. It consists of coaxial cable 12 with repeater or main trunk amplifiers 13 connected in series with and spaced along the cable. AGC amplifiers may also be connected in series with the cable to provide automatic correction for changes in signal level. The main trunk line also includes bridging amplifiers 14, each having several outputs and enough gain to make up for isolation loss and power loss inherent in multiple outputs. From the bridging amplifiers feeder lines 15 are run along a row of subscribers' houses. The feeder lines include coaxial cable 16 and line extender amplifiers 17 operable to compensate for the loss in the feeder system. As an example, each feeder line may include four to ten or more line extender amplifiers. Power to the cables is supplied at permissible levels as by the transformers or other sources 18. Between successive amplifiers 17 directional taps or couplers 19 are provided, typically with multiple outputs 20 to which individual home receivers 21 are connected; such taps being known devices. For example, a four house tap is typically used every 150 feet.

Figure 3:
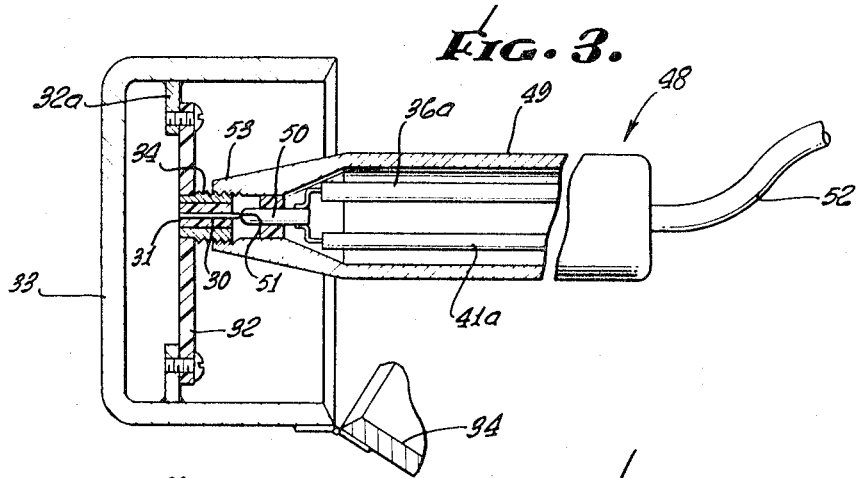
FIGURE 3 is a section showing a test point and probe.

At least some of the amplifiers seen in FIG. 1 (which may be considered as representative of signal processing circuitry) have test points at which R.F. signal levels are subject to determination. Such a test point is represented in FIG. 3 by the contact 30 embedded in a nylon insulator 31 and supported on a amplifier circuit board 32, the latter being carried by support 32a within a receptacle 33, the cover 34 of which is open.

FIG. 2 schematically indicates the equipment for indicating the signal level at such a test point, the R.F. signal to be measured appearing at 35. The equipment includes a phase sensitive detector 36 and a tracking oscillator 37 electrically connected in a phase locked loop, the detector output voltage at 38 being delivered via amplifier 39 to the voltage controlled tracking oscillator 37, and the oscillator output frequency delivered at 40 to the detector. The oscillator is typically tunable between channel 2 and 13 frequencies, to match the input R.F. frequency. Any phase difference between the oscillator output frequency and the input channel R.F. is detected as a positive or negative voltage applied to the oscillator to advance or retard the phase of the oscillator output, so as to phase-lock the detector and oscillator.

The FIG. 2 equipment also includes a synchronous detector 41 electrically connected to be responsive to the system R.F. signals applied at 42, and to a phase shifted version of the oscillator signal delivered to the phase detector, the phase shifted version being applied at 43. The synchronous detector produces a DC output voltage at 44 characterized as substantially proportional to the level of the system R.F. input signal at 42, that output being applied via amplifier 45 to indicating means such as voltmeter 46 to produce an indication of the R.F. signal level. Both detectors are typically linearized by relatively large oscillator output voltage developed at 40 and 43, and the detectors are further characterized as presenting high input impedance to the input R.F. at 35. Further, the voltage controlled oscillator is typically made to produce a signal at 43 in phase quadrature (90°) with respect to the signal at 40.

The two detectors 36 and 42 are typically carried by a probe represented at 48 in FIG. 2, and exemplified at 48a in FIG. 2. The probe in the latter figure is illustrated as having a tubular body 49 that is hand manipulable, the detector circuit boards 36a and 41a being contained in the hollow body. The probe also incorporates a terminal 50 adapted to be brought into forcible engagement at 51 with the test point contact 30, the terminal 50 thereby placing the detector inputs in close proximity to the test point 30. As a result, need for jumper cable between the test points and detectors is eliminated, improving accuracy of R.F. signal level determination.

The connection between the detectors and oscillator as well as meter 46 are represented in FIG. 3 by the flexible cable 52 attached to the probe 48. The latter is easily attached to the circuitry support, i.e., board 32, as by fastener means proximate test point 30. The fastener means typically includes a threaded tip 53 of the probe body engaging a threaded sleeve 54 centering the test point contact 30 and attached to board 32. When tip 53 is screwed onto sleeve 54, the centered terminal 50 is brought into positive forcible engagement with contact 30, to minimize loss of signal during transmission to the detectors.

Figure 4:
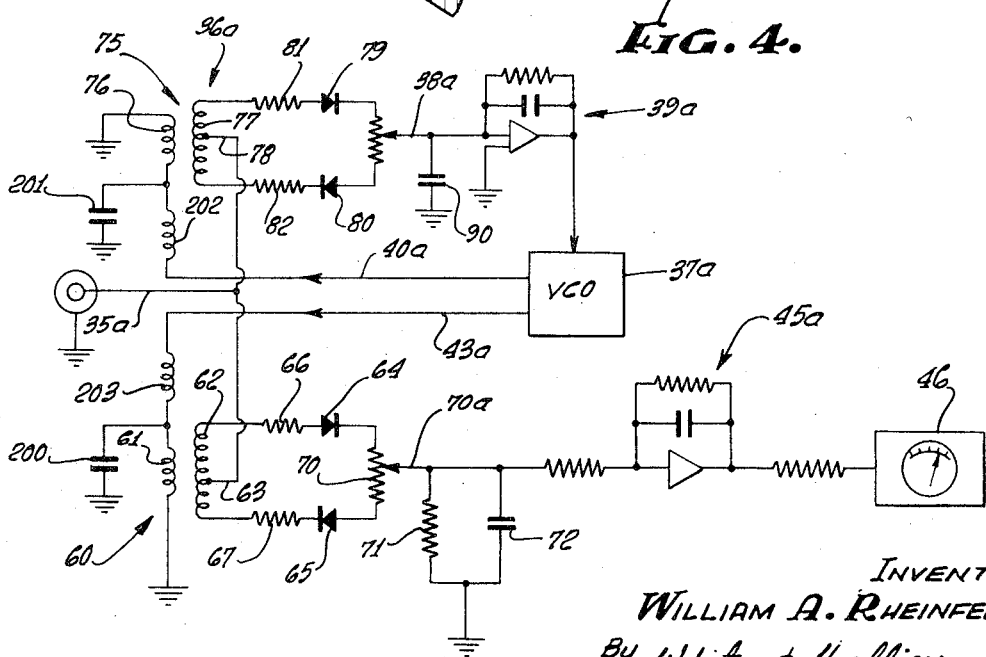
FIG. 4 is a diagram illustrating phase detector and synchronous detector circuitry usable in the FIG. 1 block diagram.

Turning now to the more detailed circuit of FIG. 4, the synchronous detector 41a is shown to include a transformer 60 having primary and secondary windings 61 and 62, the secondary being center tapped at 63. The detector also includes oppositely poled diode rectifiers 64 and 65 respectively connected via current limiting resistors 66 and 67 between the opposite end terminals of the secondary 62 and opposite ends of the potentiometer resistor 70. In operation, the oscillator produced reference frequency applied at 43a to primary coil 61 bears a fixed phase relationship (90° for example) to the input R.F. applied at 35a to center taps 63 with the result that a DC signal corresponding to the level of the input R.F. signal appears at wiper arm 70a and across load resistor 71. That signal is filtered at 72 and passed via operational amplifier 45a to the level indicating device or meter 46a. Wiper arm 70a is adjustable for output calibration.

The phase detector 36a shown in FIG. 4 likewise includes a transformer 75 having primary and secondary windings 76 and 77, the secondary having a center tap at 78 to which input R.F. is applied. Oppositely poled diodes 79 and 80 are respectively connected via current limiting resistors 81 and 82 between opposite end terminals of the secondary coil 77 and opposite ends of potentiometer resistor 84. The VCO output is applied at 40a to the primary coil 76. In operation, the detector output at 38a is above an adjustable level if the oscillator output frequency at 40a leads the input R.F., and is below that level if the oscillator output frequency lags the input R.F., the magnitude of the detector output departure from "null" level corresponding to the magnitude of the phase difference. As a result, the voltage controlled oscillator 37a is driven in phase-lock with the input R.F. under test. The detector output is applied to the oscillator via operational amplifier 39a. An integrating capacitor 90 is connected in shunt with the detector output at 38a.

The oscillator 37a typically includes control means to switch the oscillator output to the phase detector between frequencies closely corresponding to television channel frequencies. Thus, the oscillator may advantageously incorporate a circuit as seen in FIG. 5, wherein a version of the phase detector output is supplied to the oscillator at 38b, and the oscillator outputs to the phase detector and synchronous detector appear at 40a and 43a. The input DC voltage controls the variable capacitance 100 in the oscillatory circuit that includes transistor 101, coil 102, capacitors 103 and 104, and a selected one of the capacitors in the bank 105. The latter capacitors are controllably switched at 106 into the oscillatory circuit to effect oscillation at R.F. frequencies close to television channel frequencies. DC voltage controlled capacitance 100 effectually controls the oscillatory circuit at any selected frequency so as to phase-lock the oscillator output 40a to the R.F. input supplied to the phase detector.

Feedback to the transistor base is accomplished via the resistance network indicated generally at 107, and which is controllable to alter the transistor base and emitter bias for optimizing the phase-lock action of the oscillator. Thus, voltage at 108 in the oscillatory circuit is dropped through resistors 109–112 and applied to switch 113 which is ganged to switch 106 for selective application to the emitter and base electrodes via the resistors indicated, switch 113 rotating clockwise when switch 106 rotates counterclockwise. Capacitor 115 connected between the transistor emitter and the output 43a assures a 90 degree phase difference between outputs 40a and 43a.

Merely for purposes of illustration, the circuit components in FIGS. 4 and 5 may be identified and have values as follows:

FIG. 4

Diodes:
    64, 65, 79, 80 _____ 980306 (1N914A)
Transformers:
    60, 75 _____(¹)

¹ Four turn primary, four turn secondary bifilar (core: ferrite Q-1 material, ¼″ dia.).

Resistors and potentiometers:
    66 _____ 100Ω
    67 _____ 100Ω
    70 _____ 10K
    81 _____ 100Ω
    82 _____ 100Ω
    84 _____ 10K
    71 _____ 100K Capacitors:
    72 _____ 470 pf.
    90 _____ 470 pf.
    200, 201 _____ (²)

² These components in conjunction with coils 202 and 203 are selected in such a manner as to give a composite 90° φ shift.

Coils:
    202, 203 _____(³)

³ See above.

FIG. 5

Transistor _____ 2N3563
Resistors:
    109 _____ 68K
    110 _____ 33K

| | |
|---|---|
| 111 | 10K |
| 112 | 1.5K |
| 116 | 10K |
| 117 | 54K |
| 118 | 150K |
| 119 | 33K |
| 120 | 30K |
| 121 | 1.6K |
| 122 | 51K |
| 123 | 1K |
| 124 | 10K |
| 125 | 1K |
| 126 | 10K |
| 127 | 22K |

Coils:

| | |
|---|---|
| 102 | (⁴) |
| 128 | RFC 10 μh. |

⁴ 6 turn primary tap at 1 turn from cold end.

Capacitors: Pf.

| | |
|---|---|
| 103 | 1000 |
| 104 | 1000 |
| 105a | 375 |
| 105b | 298 |
| 105c | 245 |
| 105d | 181 |
| 105e | 155 |
| 105f | 19 |
| 105g | 17 |
| 105h | 15 |
| 105i | 13 |
| 105j | 11 |
| 105k | 9 |
| 105l | 8 |
| 115 | 240 |
| 129 | 470 |
| 130 | 1000 |
| 131 | 1000 |
| 132 | 620 |
| 133 | 560 |
| 134 | 560 |

100, V-27.

I claim:

1. Signal level indicating equipment for use in a cable television system including cable to transmit multiple channel television signals for distribution to subscriber equipment, the system also including television signal processing circuitry having test points at which R.F. signal level is subject to determination, said equipment including a phase sensitive detector and a tracking oscillator electrically connected in a loop, the detector having an input to receive a system R.F. signal at one of said points, a synchronous detector electrically connected to be responsive to said system R.F. signal and to a phase shifted version of the oscillator signal delivered to the phase detector thereby to produce a DC output substantially proportional to the level of said system R.F. signal, indicating means responsive to said DC output to produce an indication thereof, and including a manipulable probe having a body and a terminal adapted to be brought into contact with one of said test points, said detectors and terminal being carried by said body to place said detectors in close input proximity via the terminal to the system R.F. signal inputs at the test points, the oscillator including control means for switching the oscillator output to the phase detector between frequencies closely corresponding to multiple television channel frequencies, the detectors characterized as presenting high impedance to the R.F. input thereto.

2. The indicating equipment as defined in claim 1 in which said oscillator is spaced from said probe, the connections between said detectors and said oscillator being defined by elongated flexible cable leading from the probe to the oscillator.

3. The indicating equipment as defined in claim 1 in which said indicating means is spaced from said probe, the connection between said synchronous detector and said indicating means being defined by elongated flexible cable leading from the probe to said indicating means.

4. The indicating equipment as defined in claim 1 including said processing circuitry and a container therefor, a support to support the circuitry at the container, and faster means proximate a test point to attach the probe to the support when the probe terminal is brought into contact with a test point.

5. The indicating equipment as defined in claim 1 in which the phase detector comprises a bridge network having an input transformer with a tapped secondary to which the oscillator output is supplied, resistance connected across the secondary, and oppositely poled diodes respectively connecting end terminals of the secondary and said resistance.

6. Indicating equipment as defined in claim 5 in which the synchronous detector comprises a bridge network having an input transformer with a tapped secondary to which the oscillator output is supplied, resistance connected across the secondary, and oppositely poled diodes respectively connecting end terminals of the secondary and said resistance.

References Cited

UNITED STATES PATENTS

| | | | |
|---|---|---|---|
| 2,564,059 | 8/1951 | Gensel | 325—421 |
| 2,879,382 | 3/1959 | Freen | 325—67 |
| 3,122,704 | 2/1964 | Jones | 325—363 |
| 3,283,242 | 11/1966 | Oliver | 324—149 X |
| 3,300,718 | 1/1967 | Umphrey | 324—72.5 |

OTHER REFERENCES

Telephone Engineer and Management; Nov. 15, 1965, vol. 69, No. 2; pp. 37–41.

ROBERT L. GRIFFIN, Primary Examiner

BENEDICT V. SAFOUREK, Assistant Examiner

U.S. Cl. X.R.

178—6; 324—72.5, 83; 325—363